United States Patent
Firestone et al.

(10) Patent No.: US 9,752,953 B2
(45) Date of Patent: Sep. 5, 2017

(54) DETECTING WHEEL RIM CRACKS

(71) Applicant: PNEUMACORE, INC., Delray Beach, FL (US)

(72) Inventors: Stephen Firestone, Delray Beach, FL (US); Seth Schneider, Delray Beach, FL (US)

(73) Assignee: Preventcore, Incorporated, Boca Raton, FL (US)

( * ) Notice: Subject to any disclaimer, the term of this patent is extended or adjusted under 35 U.S.C. 154(b) by 205 days.

(21) Appl. No.: 14/767,147

(22) PCT Filed: Feb. 10, 2014

(86) PCT No.: PCT/US2014/015494
§ 371 (c)(1),
(2) Date: Aug. 11, 2015

(87) PCT Pub. No.: WO2014/124349
PCT Pub. Date: Aug. 14, 2014

(65) Prior Publication Data
US 2016/0003704 A1 Jan. 7, 2016

Related U.S. Application Data

(60) Provisional application No. 61/763,199, filed on Feb. 11, 2013.

(51) Int. Cl.
*G01M 3/20* (2006.01)
*G01J 1/58* (2006.01)
(Continued)

(52) U.S. Cl.
CPC .......... *G01M 3/20* (2013.01); *G01J 1/58* (2013.01); *G01M 17/013* (2013.01); *G01M 17/021* (2013.01); *B29C 73/163* (2013.01)

(58) Field of Classification Search
CPC .... G01M 3/20; G01M 17/013; G01M 17/021; G01J 1/58; B29C 73/163
See application file for complete search history.

(56) References Cited

U.S. PATENT DOCUMENTS 3,266,296 A * 8/1966 Hall ..................... G01M 3/24
                                               29/894.3
3,483,053 A * 12/1969 Miserentino .......... B29C 73/163
                                               106/33

(Continued)

FOREIGN PATENT DOCUMENTS

| GB | 2331052 | 5/1999 |
|---|---|---|
| JP | 7243991 | 9/1995 |

(Continued)

OTHER PUBLICATIONS

Simoniz USA Inc., Ballast Boost—Material Safety Data Sheet, dated Jun. 29, 2011, p. 1—retrieved Jan. 23, 2013.

(Continued)

*Primary Examiner* — David Bolduc
(74) *Attorney, Agent, or Firm* — Fleit Gibbons Gutman Bongini & Bianco PL; Paul D. Bianco; Gary S. Winer

(57) ABSTRACT

A crack in a wheel rim is detected by placing a composition including a liquid carrier, such as water, and a fluorescent dye, into an interior space formed between a tire and a rim. After an interval, the exterior surface of the wheel rim is inspected using a UV light source, which causes visible light to be emitted from the fluorescent dye. The light emissions indicate the presence of dye which has seeped from the interior space, through a crack in the material of the rim, to an exterior of the rim. A conditioner or sealant can be combined with the fluorescent dye to provide other benefits.

20 Claims, 3 Drawing Sheets

(51) Int. Cl.
*G01M 17/02* (2006.01)
*G01M 17/013* (2006.01)
*B29C 73/16* (2006.01)

(56) References Cited

U.S. PATENT DOCUMENTS

| | | | | |
|---|---|---|---|---|
| 3,721,117 A * | 3/1973 | Ford | ................... | G01M 3/2876 |
| | | | | 73/40.7 |
| 4,561,481 A | 12/1985 | Kawauchi | | |
| 4,612,798 A | 9/1986 | Roberts | | |
| 4,693,118 A | 9/1987 | Roberts | | |
| 4,754,638 A * | 7/1988 | Brayman | ............... | G01M 3/205 |
| | | | | 73/40.7 |
| 4,813,268 A * | 3/1989 | Helvey | ................. | G01M 3/205 |
| | | | | 73/40.7 |
| 4,852,390 A * | 8/1989 | Fisch | ...................... | G01M 3/24 |
| | | | | 73/40.5 A |
| 4,918,976 A | 4/1990 | Fogal | | |
| 4,969,350 A | 11/1990 | Fogal | | |
| 4,991,426 A * | 2/1991 | Evans | ................... | G01M 3/24 |
| | | | | 73/1.05 |
| 5,010,761 A * | 4/1991 | Cohen | ................... | G01M 3/229 |
| | | | | 73/40.7 |
| 5,018,381 A * | 5/1991 | Campos | .................. | G01M 3/06 |
| | | | | 73/45.5 |
| 5,145,127 A * | 9/1992 | Barnes | ................ | G01M 17/013 |
| | | | | 244/103 R |
| 5,267,468 A * | 12/1993 | Zoccoletti | ............... | G01M 3/26 |
| | | | | 73/40 |
| 5,364,463 A | 11/1994 | Hull | | |
| 5,431,041 A * | 7/1995 | Sala | ........................ | G01M 3/24 |
| | | | | 73/40 |
| 5,500,456 A * | 3/1996 | Hughett | ................ | B29C 73/163 |
| | | | | 523/166 |
| 5,772,747 A | 6/1998 | Turner | | |
| 5,850,036 A * | 12/1998 | Giromini | .............. | G01M 3/226 |
| | | | | 198/340 |
| 5,975,151 A * | 11/1999 | Packo | ..................... | F25B 45/00 |
| | | | | 141/18 |
| 6,439,031 B1 * | 8/2002 | Pieroni | ................... | G01M 3/20 |
| | | | | 73/40.7 |
| 6,886,389 B1 * | 5/2005 | Hagar | ................... | G01M 3/226 |
| | | | | 73/40.7 |
| 7,197,914 B2 * | 4/2007 | Maresca, Jr. | ........... | G01M 3/22 |
| | | | | 73/40.7 |
| 7,389,706 B2 * | 6/2008 | Bratton | ..................... | F17D 5/00 |
| | | | | 422/62 |
| 2004/0084120 A1 | 5/2004 | Arnold et al. | | |
| 2004/0084123 A1 | 5/2004 | Pagano et al. | | |
| 2005/0092075 A1 * | 5/2005 | Saunders | ................ | G01M 1/02 |
| | | | | 73/146 |
| 2007/0259990 A1 | 11/2007 | Katz | | |
| 2008/0297777 A1 * | 12/2008 | Sotgiu | ................. | B60C 25/0554 |
| | | | | 356/139.09 |
| 2010/0222455 A1 * | 9/2010 | Dowel | .................. | B29C 73/163 |
| | | | | 523/166 |
| 2012/0053876 A1 | 3/2012 | Followell | | |

FOREIGN PATENT DOCUMENTS

| | | |
|---|---|---|
| WO | 2008/022402 | 2/2008 |
| WO | 2008022402 | 2/2008 |
| WO | 2014124349 | 8/2014 |

OTHER PUBLICATIONS

Simoniz USA Inc., Life-X-Tend—Material Safety Data Sheet, dated Aug. 9, 2010, p. 1—retrieved Jan. 23, 2013.
Ian Ross, Researchers Examine Underground Mining Wheel Rims, published Aug. 5, 2010—pp. 3—retrieved Feb. 6, 2013.
Pneumacore, Sealant for Ballast-Filled Tires, Seals Punctures Permanently—p. 1—retrieved Jan. 23, 2013.
Simoniz, Sealtite Installation Options—p. 25, p. 1—retrieved Jan. 23, 2013.
Simoniz, Business to Business, Life X-Tend, p. 1—retrieved Jan. 23, 2013.
Sealtite, Use & Specifications—p. 23, p. 1—retrieved Jan. 23, 2013.
Simoniz USA Inc., Sealtite Pro—Material Safety Data Sheet, dated Aug. 9, 2010, p. 1—retrieved Jan. 23, 2013.
Simoniz , Sealtite Pro-Plus—Sealant for High-Speed & Mixed Use Applications, pp. 2—retrieved Jan. 23, 2013.
Dayglo A & AX Pigments—Physical Properties & Chemical Nature—Copyright DayGlo, pp. 5—retrieved Jan. 11, 2013.
International Preliminary Report on Patentability dated Aug. 20, 2015 for PCT/US2014/015494 filed Feb. 10, 2014.
International Search Report dated May 23, 2014 for PCT/US2014/015494 filed Feb. 10, 2014.
Written Opinion dated May 23, 2014 for PCT/US2014/015494 filed Feb. 10, 2014.
Installing Sealtite with pressure retrieved on or before Feb. 1, 2013.

* cited by examiner

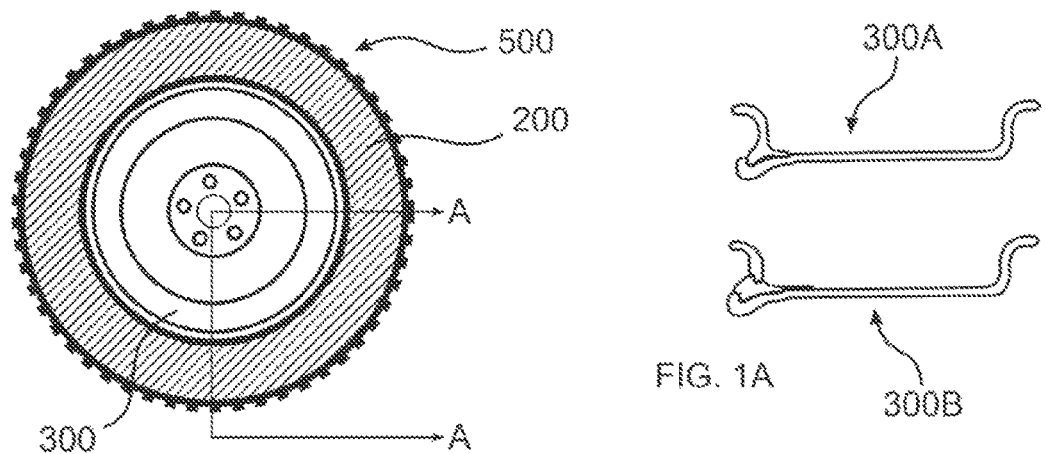
FIG. 1
FIG. 1A
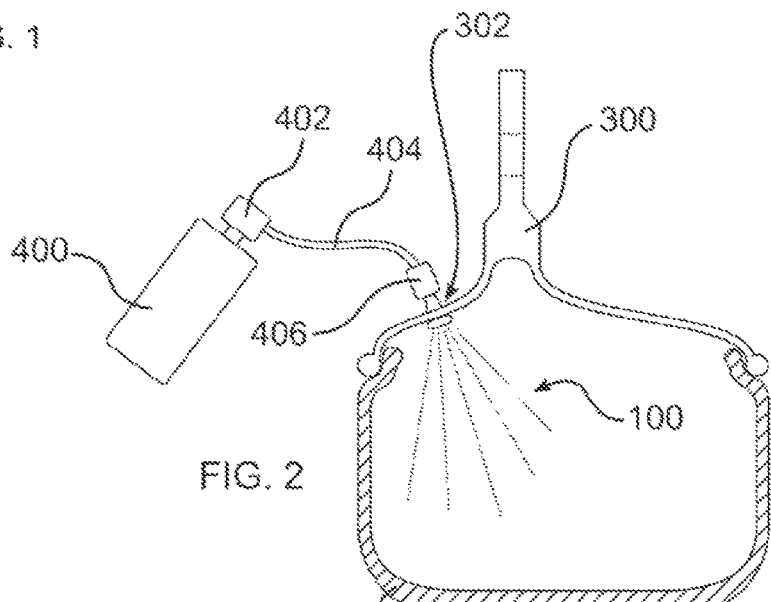
FIG. 2
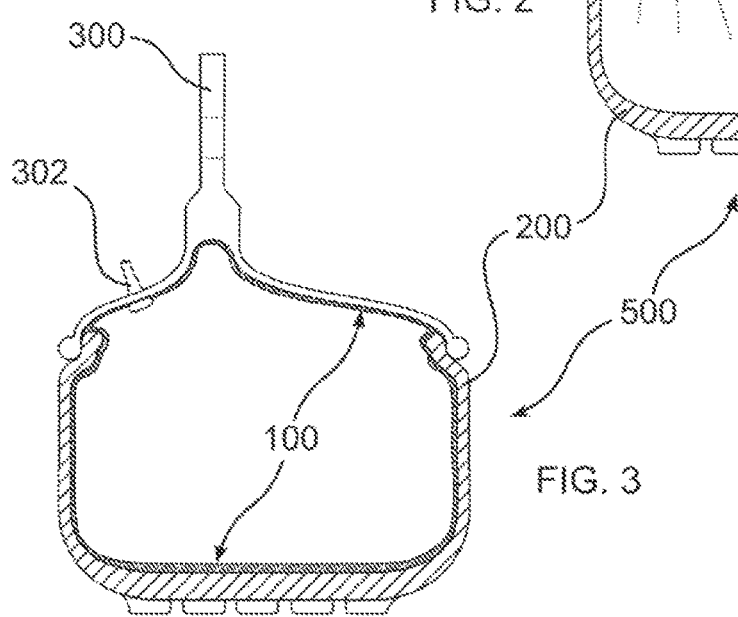
FIG. 3

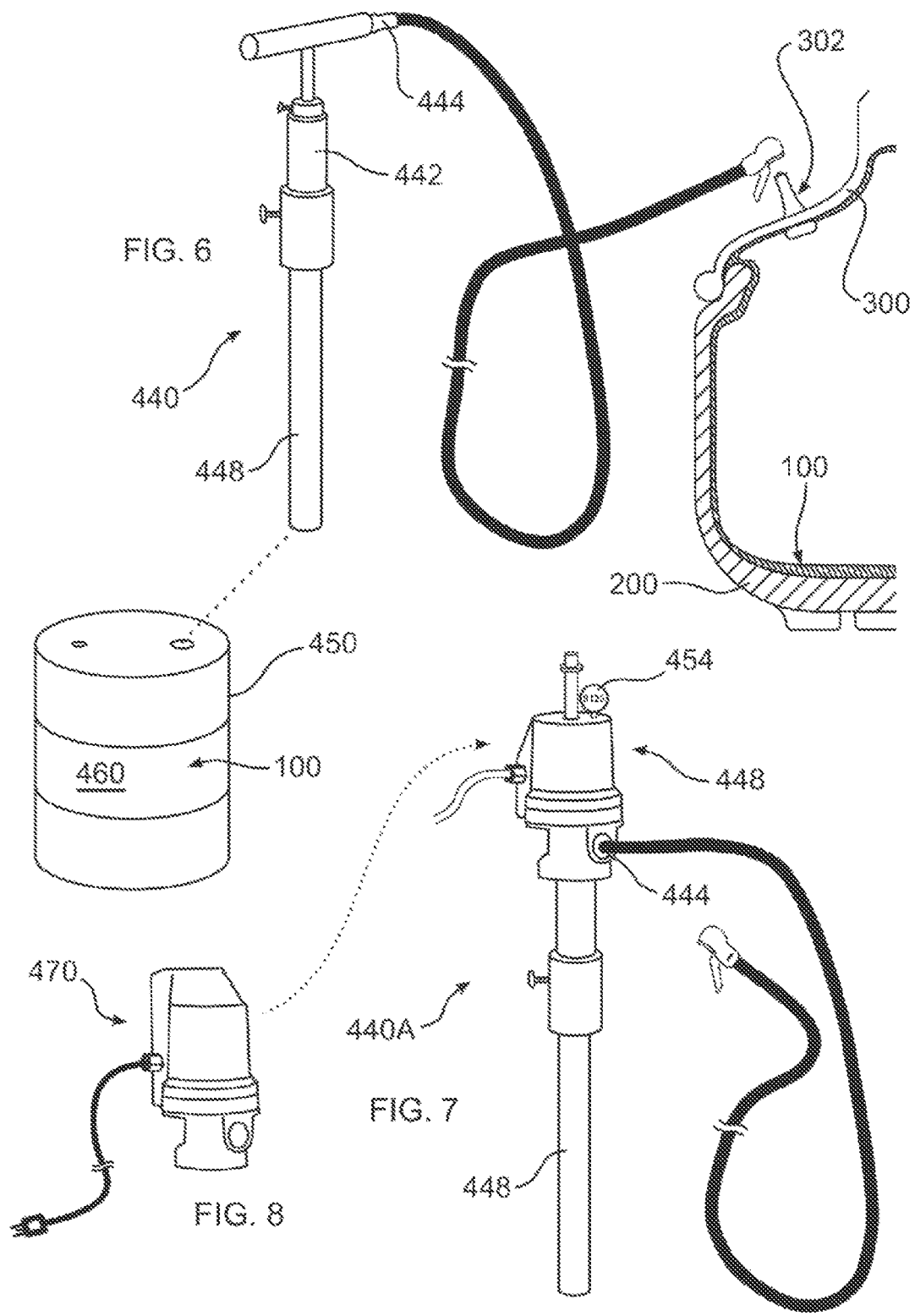

DETECTING WHEEL RIM CRACKS

FIELD OF THE INVENTION

The invention relates to a system and method for detecting cracks in wheel rims, and more particularly to detecting cracks using a fluorescing agent.

BACKGROUND OF THE INVENTION

Wheel imbalance causes vibration in both heavy duty tires and high speed tires which is fatiguing to a driver, and which causes premature wear of the vehicle and tires, increased rolling resistance, and a decrease in fuel mileage.

Porosity leaks in the rim, tire, or tread area decrease the life of the tire by causing the tire to be operated at an incorrect pressure, resulting in an improper rolling profile. Rim corrosion is one source of leaks and weakness in a rim. Other sources include a loss of flexibility and suppleness in the tire carcass, and the formation of one or more cracks in the tire and or rim.

SUMMARY OF THE INVENTION

In accordance with an embodiment of the disclosure, a method of detecting seepage from a wheel rim, comprises placing a composition including propylene glycol and a fluorescent dye into an interior space formed between a tire and a rim; and waiting an interval, then inspecting an exterior surface of the wheel rim, using a light source which causes visible light to be emitted from the fluorescent dye, to detect the presence of dye which has seeped from the interior space through material of the rim to an exterior of the rim.

In various embodiments thereof, the composition further includes triethanolamine; the composition further includes ceramic fibers; the composition further includes aluminosilicate fibers; the composition further includes cellulose; the composition is placed into the interior space when the tire has been partially assembled onto the rim; the composition is placed into the interior space when the tire is fully seated upon the rim; the composition is placed into the interior space when the tire is at least partially inflated; and the dye is selected from DAYGLO A- and AX pigments, phthalocyanine, napthalocyanine, aluminum compound of aromatic amine, methane dye, azulene-squaric acid dye, UVITEX OB, TINOPAL SFp, TRY-33 (CAS#. 801-00023-5021-P), TRY-53, MT-6172-IB, and fluorescein.

In other variations thereof, the composition further includes a ballast material; the ballast material retards oxidation of metal of the rim in the presence of water; the rim is fabricated with at least one of aluminum, steel, brass, copper, iron, chrome, and magnesium alloy; inspecting is carried out using an electronic sensor; and the composition is added to the interior space using an air compressor and a pump, the pump operative to increase a gas pressure in the interior space while adding the composition.

In another embodiment of the disclosure, a method of detecting cracks in wheel rim, comprises placing a composition including propylene glycol, triethanolamine, and a fluorescent dye into an interior space formed between a tire and a rim; and waiting an interval, then inspecting an exterior surface of the wheel rim, using a UV light source which causes visible light to be emitted from the fluorescent dye, to detect the presence of dye which has seeped from the space through a crack in the material of the rim, to an exterior of the rim. In a variation thereof, the method further includes repairing the crack.

In another embodiment of the disclosure, a system for detecting cracks in wheel rims, comprises a composition including propylene glycol and a fluorescent dye; and a pumping system configured for adding the composition into an interior space formed between a tire and a rim under pressure. In an embodiment thereof, the system further includes an electronic detection system configured for detecting the presence of fluorescent dye which has seeped from the interior space through a crack in the material of the rim to an exterior of the rim.

In a yet further embodiment, a method of detecting seepage from a wheel rim, comprises placing a composition including a liquid carrier and a fluorescent dye into an interior space formed between a tire and a rim; and waiting an interval, then inspecting an exterior surface of the wheel rim, using a UV light source which causes visible light to be emitted from the fluorescent dye, to detect the presence of dye which has seeped from the interior space through material of the rim to an exterior of the rim. In various embodiments thereof, the liquid carrier includes at least one of water, ethylene glycol, and propylene glycol.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 depicts a tire mounted upon a rim, to form a wheel;

FIG. 1A depicts exemplary multi-part rims which may be used together with compounds and methods of the disclosure;

FIG. 2 depicts a cross-section of the wheel of FIG. 1, taken along line A-A, and further depicting a composition of the disclosure being added to an interior space of the tire and rim through a tire valve, using an aerosol can;

FIG. 3 depicts the cross-section of FIG. 2, with the composition distributed throughout the interior space;

FIG. 6 depicts a manual pump that may be used to combine a composition of the disclosure with a tire and rim;

FIG. 7 depicts a pneumatic pump assembly that may be used in place of the manual pump of FIG. 6; and FIG. 8 depicts an electric pump assembly that may be used in place of the manual pump of FIG. 6.

DETAILED DESCRIPTION OF THE INVENTION

Figure 4:
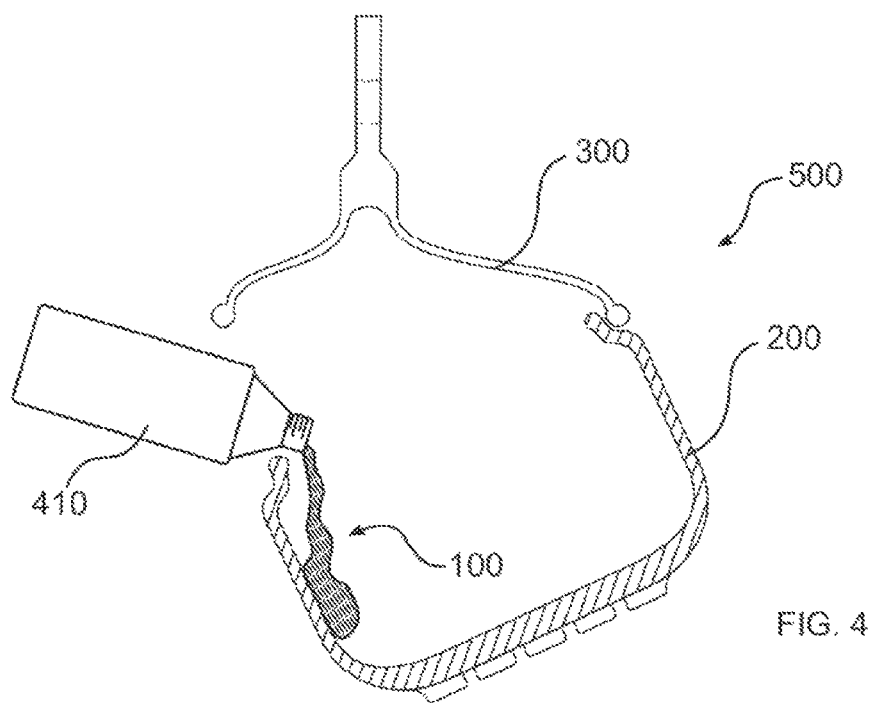
FIG. 4 depicts the cross section of FIG. 2, the tire not fully mounted upon the rim, a composition of the disclosure being poured into an interior space formed by the tire and the rim.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

In accordance with the disclosure, a tire sealant reduces flats by forming a durable seal within a puncture within seconds, sealing punctures, for example of up to ⅜", or within a range of several microns, to an inch or more, depending on the width of the puncture. The sealant is used in any form of pneumatically inflated and non inflated form of tire. In an embodiment, the sealant includes conditioners to lubricate and preserve the tire, particularly providing protection for tires experiencing extremes in temperature, impact, and vibration.

In a further embodiment of the disclosure, corrosion resistant agents in the sealant reduce corrosion in metal rims of wheels. In a yet further embodiment of the disclosure, tire conditioner agents lubricate an interior of a tire, particularly including a bead area of the tire, facilitating mounting and or dismounting of the tire from a wheel rim, and protecting tire casings.

In another embodiment of the disclosure, tire conditioning agents of the disclosure keep an inner lining or liner of a tire supple. Without being bound by any particular theory, the conditioner of the disclosure includes agents which maintain a balance of materials in the tire replacing or supplementing materials which are volatilized or otherwise lost over time, which would tend to produce a less supple carcass, which is more prone to cracking, and which could lead to air loss or tire failure.

By maintaining a supple and sealed tire, a correct air pressure is better maintained, and the tire tread contacts the road with a more even weight distribution, reducing heat within the tire carcass, and increasing tread life.

In a further embodiment of the disclosure, tire conditioning agents of the disclosure maintain substantial freeze protection, for example, to −24° F. (−31° C.), and additional freeze protection substantially below this temperature.

In another embodiment of the disclosure, tire conditioner of the disclosure does not block valve stems of a wheel when air is added or released from the tire through the valve stem. The tire conditioner of the disclosure is additionally advantageously not harmful to the environment, and is water soluble. A tire sealant of the disclosure can reduce porosity of the tire, reducing air loss.

In another embodiment of the disclosure, a tire sealant of the disclosure includes ceramic fibers which interlock within a crack to seal punctures or other openings in a tire, including punctures, for example, in treads of heavy duty, high-speed tires, although punctures may be sealed in all tire types in this manner. The ceramic fibers remain in place under high centrifugal forces and under high heat build-up in high-speed tires. Multiple punctures, whether formed contemporaneously or at substantial intervals, can be sealed in a like manner, provided sufficient sealant is present within the tire to fill all punctures. In an embodiment, a tire sealant of the disclosure includes propylene glycol and ceramic fibers. Once a plug has been formed by sealant of the disclosure, within a puncture, this plug is highly resistant to erosion in the presence of water, forming a durable repair which can last the remaining lifetime of a tire. In addition, a sealant and a conditioner of the disclosure is easily cleaned from within a tire by wiping or the application of water under pressure. A tire sealant of the disclosure, in addition to or in lieu of the sealant, reduces air loss by reducing porosity of the tire material.

In an embodiment of the disclosure, a tire conditioner includes water, propylene glycol (CAS#57-55-6), and triethanolamine (CAS#102-71-6), to produce a non-flammable light orange transparent liquid, having a specific gravity of 1.05, a pH of 8.0-9.0, and a boiling point of 210° F. (99° C.), which is dispersible in water. An example of such sealant include SEALTITE LIFE-X-TEND.

In an embodiment of the disclosure, a tire conditioner and sealant includes water, propylene glycol (CAS#57-55-6). Another embodiment includes ethylene glycol and water. A further embodiment combines water, propylene glycol, aluminosilicate fiber (CAS#142844-00-6), and triethanolamine (CAS#102-71-6), to produce a non-flammable light yellow opaque gel with visible fibers, having a specific gravity of 1.1, a pH of 8.0-9.0, and a boiling point of 210° F. (99° C.), which is dispersible in water. An example of a conditioner/sealant composition includes SEALTITE PRO, SEALTITE PRO-PLUS and SEALTITE OFF-ROAD. It should be understood, however, that substantial variation in the materials and concentrations of these particular examples can be used in accordance with the disclosure. In one example, other ceramic fiber may be substituted for aluminosilicate fibers. The foregoing materials provide corrosion resistant to at least the following metals: aluminum, steel, brass, copper, iron, chrome, and magnesium alloy.

In another embodiment of the disclosure, a conditioner of the disclosure is used as a ballast material in filling tires for additional weight and stability, including, for example, use in tractor tires when traversing soft ground. In one embodiment, a ballast boost material of the disclosure includes water, propylene glycol, aluminosilicate fiber, triethanolamine, and cellulose (CAS#9004-34-6), which is a non-flammable colorless opaque gel with visible fibers, a specific gravity of 1.1, a pH of 7.0-8.5, and a boiling point of 210° F. (99° C.), which is dispersible in water. All of the foregoing constituents contribute to ballast properties. Other ballast agents which can be used, include for example, calcium chloride, ethylene glycol, windshield washer fluid, methanol, glycerin, and de-sugared molasses (beet juice). The ballast constituents advantageously counteract an incidence of corrosion that would be attributable to the introduction of water, alone, to the interior of the wheel. An example of a ballast composition includes SEALTITE BALLAST BOOST. It should be understood, however, that substantial variation in the materials and concentrations of this particular example can be used in accordance with the disclosure. In one embodiment, fibers may be omitted, reducing sealing ability, but also lowering a cost of manufacture, and lowering viscosity. The ballast material advantageously retards oxidation of metal of the rim in the presence of water.

The foregoing conditioner, conditioner/sealant, and conditioner/sealant/ballast example formulations have a freezing point of −34° F. (−37° C.), and an operating temperature of 240° F. (116° C.).

In a further embodiment of the disclosure, a conditioner, with or without inclusion of a sealant of the disclosure, forms a hydrodynamic balancer for a wheel. Without being bound to any particular theory, the conditioner of the disclosure is distributed about the inner surface of the tire in varying thicknesses dependent on localized surface topography. In another theory, possibly working together with the foregoing theory, conditioner of the disclosure is distributed about the inner surface of the tire in varying thicknesses dependent on vibrations produced by imbalance, until imbalance is quelled. In another theory, the viscosity of the conditioner promotes maintenance of an appropriate distribution of condition during operation of the tire to promote balancing.

In accordance with a yet further embodiment of the disclosure, a tire conditioner, or a tire conditioner including sealant or ballast agent, is used to identify wheel rim bead leaks, rim cracks, tire punctures, and tire vent hole leaks. The conditioner has a sufficiently low viscosity that it can penetrate very small cracks in a tire casing, valve stem, or metallic wheel rim, whereupon conditioner material that has seeped through the material from inside the tire, rim, or valve area can be observed on a surface thereof. In one embodiment, a light colored powder, for example talcum powder, may be added to an exterior surface of a mounted tire to detect a presence of such seeped conditioner. It is therefore advantageous to thoroughly clean an exterior surface of the tire and rim if such method is used.

Useful ranges of ingredients for an exemplary tire sealant formulation may be found in Example 1, and for an exemplary tire conditioner in Example 2. It should be understand that these examples are non-limiting, and not all constituents of these formulae are required in order to detect cracks in accordance with the disclosure.

Example 1

Exemplary Tire Sealant Formulation

| | |
|---|---|
| WATER | 25-75% |
| ANTIFREEZE/ANTI-BOIL | 25-75% |
| BIOCIDE | 0-2% |
| CORROSION INHIBITOR | 0-7% |
| FIBERS | 0-12% |
| COLORANT | 0-2% |
| GELLING AGENT | 0-2% |
| FLUORESCING DYE | 0-1% |
| DILUENT/INERT | 1-5% |

Example 2

Exemplary Tire Conditioner Formulation

| | |
|---|---|
| WATER | 25-75% |
| ANTIFREEZE/ANTI-BOIL | 25-75% |
| BIOCIDE | 0-2% |
| CORROSION INHIBITOR | 0-7% |
| COLORANT | 0-1% |
| GELLING AGENT | 0-2% |
| FLUORESCING DYE | 0-1% |
| DILUENT/INERT | 1-5% |

In an embodiment of the disclosure, a fluorescing dye is added to the conditioner, conditioner/sealant, and conditioner/sealant/ballast, or conditioner/ballast to form a compound or composition 100, whereby a seeped composition 100 is more easily detected. In this manner, it may not be necessary to thoroughly clean an exterior of a tire and or rim in order to detect seeped composition 100, and it may not be necessary to add any materials to the exterior of a tire or rim in order to facilitate visualization of seeped composition 100.

In another embodiment of the disclosure, the fluorescing dye is added to a liquid carrier, which can include only water, or can include any of the materials described herein with respect to a condition, a sealant, a ballast, or any combination of the foregoing, or some other liquid material.

In accordance with one embodiment, seeped composition 100 containing the fluorescing dye is detectable by unaided human vision in ordinary electric room lighting (e.g. incandescent, sodium vapor, mercury vapor, halogen, LED, or incandescent lighting), or in daylight. In another embodiment, the fluorescing dye is more easily visualized with the aid of a light source emitting a particular spectrum range that is more readily reflected as visible light by the fluorescing dye, for example ultraviolet light (e.g. blacklight, or UV-A light).

In one embodiment, a relatively small amount of fluorescing dye is added to the conditioner, conditioner/sealant, and conditioner/sealant/ballast, or conditioner/ballast, for example 1 part per 1024, although substantially less may be added, or substantially greater concentrations, depending on the dye used, and how much visible light must be reflected. At excessively low concentrations, it becomes too difficult for a user to detect the visible light reflected by the fluorescing dye, and at excess concentrations, there is no beneficial increase in reflected visible light and dye is wasted.

Examples of fluorescing materials which can be combined with a conditioner, conditioner/sealant, conditioner/sealant/ballast, or conditioner/ballast of the disclosure include DAY-GLO A- and AX pigments, phthalocyanine, napthalocyanine, aluminum compound of aromatic amine, methane dye, azulene-squaric acid dye, UVITEX OB, TINOPAL SFp, TRY-33 (CAS#. 801-00023-5021-P), TRY-53, MT-6172-IB, WD-801, and fluorescein. A light source used to detect the presence of seepage of any of these fluorescing materials through a tire or rim, in accordance with the disclosure, is selected to generate the greatest amount of visible light from exposure to the material, to facilitate visualization. In an embodiment, a user may wear glasses or other eyewear which enhances visualization of small or trace amounts of seeped compositions of the disclosure.

While the foregoing fluorescing materials are advantageously combined with the conditioner, conditioner/sealant, conditioner/sealant/ballast, or conditioner/ballast of the disclosure for a multi-purpose effect, they may alternatively be combined with any liquid carrier for the purpose of coating an interior of a rim or tire in order to detect leaks, including as examples calcium chloride, ethylene glycol, windshield washer fluid, methanol, glycerin, water, and or de-sugared molasses (beet juice).

With reference to FIGS. 1-3, a composition 100 of the disclosure is added to an interior of a tire 200 mounted to a rim 300 using a can 400 containing composition 100 and a pressurized gas, for example an aerosol can. The can includes a release valve 402, a hose 404, and a valve stem connector 406, connectable to a valve stem 302, so that the contents of the can be conveniently transferred to a mounted tire. Tire 200 may be under pressure or completely or partially deflated, whereby introduction of composition 100 together with the pressurized gas will tend to increase the pressure within tire 200. While a pressurized aerosol can 400 is illustrated, it should be understood that other methods of introducing gas pressure together with a composition of the disclosure may be used, including pump assemblies which use compressed air from a compressor tank such as would normally be used to inflate a tire, as described further elsewhere herein.

In FIG. 1A, two forms of multi-part rims 300A and 300B are illustrated, in cross-section as shown for rim 300 in FIG. 2. Rim 300A is a two part rim, and rim 300B is a three part rim. While these forms of multi-part rims are shown as illustrative examples, it should be understood that split side rings, flange or continuous side rings, split lock rings, cast spoke wheels, spacer bands, in both tube and tubeless forms, whether or not including an attachment hub, are contemplated as useable together with compositions and methods of the invention. More particularly, it should be understood that composition 100 of the disclosure may be used to detect cracks in portions of such rims in the manner described for single piece rims 300 herein, where one or more rim parts of rim 300A and 300B are exposable to a liquid contained under pressure in an interior space between a mounted tire and a rim, for example in tubeless applications.

In multi-part and single part tubed embodiments, where an inflation gas is contained by a tube mounted between the tire and rim, it may be difficult to maintain composition 100 in a space between the tire and a rim for an extended period, for example after significant use. Accordingly, composition 100 may be placed between the tube and rim, and cracks can be checked for before composition 100 is driven out of this space, for example after a delay. Depending on the width of the crack, a suitable delay may be minutes or many hours. Composition 100 can be applied to one side of a rim part and not the other, and gravity may be employed to drive composition 100 through cracks, if they exist, where detection may be carried out as otherwise described herein.

In another embodiment, a stream of compressed gas may be used to drive composition 100 into cracks. In a yet further embodiment, composition 100 may be combined with a stream of compressed gas, and be driven against one side of a rim or tire, to hasten the process of passage of composition 100 through any cracks that may exist. In another embodiment, composition 100 is applied in a coating over a tube prior to mounting. Composition 100 can include an adhesive material to maintain composition 100 in contact between the tube and a rim or tire, where composition 100 can seep from an exterior of the tube to an interior of the tire 200 or rim 300, 300A, 300B, where it may seep to reveal cracks.

In FIG. 3, it may be seen that composition 100 has been dispersed, by the introduction together with a gas under pressure, to coat the inside of the tire, as well as the interior surfaces of the rim and valve stem. Alternatively or additionally, composition 100 will be distributed throughout the interior of tire 200 and rim 300 when a vehicle to which they are rotatably mounted is operated, by rotation of the tire and attendant centrifugal force, as well as vibration and vertical movement of the tire. With reference to FIG. 4, it may be seen that composition 100 may be added directly to a completely or partially demounted tire 100, for example just prior to completing mounting of tire 200 onto rim 300. In the example of FIG. 4, composition 100 is added using a discrete container 410, however it should be understood that composition 100 may be added using a hose connected to a larger moveable or immovable reservoir of composition 100.

In an embodiment of the disclosure, water is added to other constituents of composition 100 just prior to introduction to tire 200 and rim 300. In a further embodiment, fluorescing dye is added to composition 100 prior to introduction to tire 200 and rim 300. In a yet further embodiment, any combination of individual constituents are added to the remaining constituents just prior to such use, to form composition 100.

Figure 5:
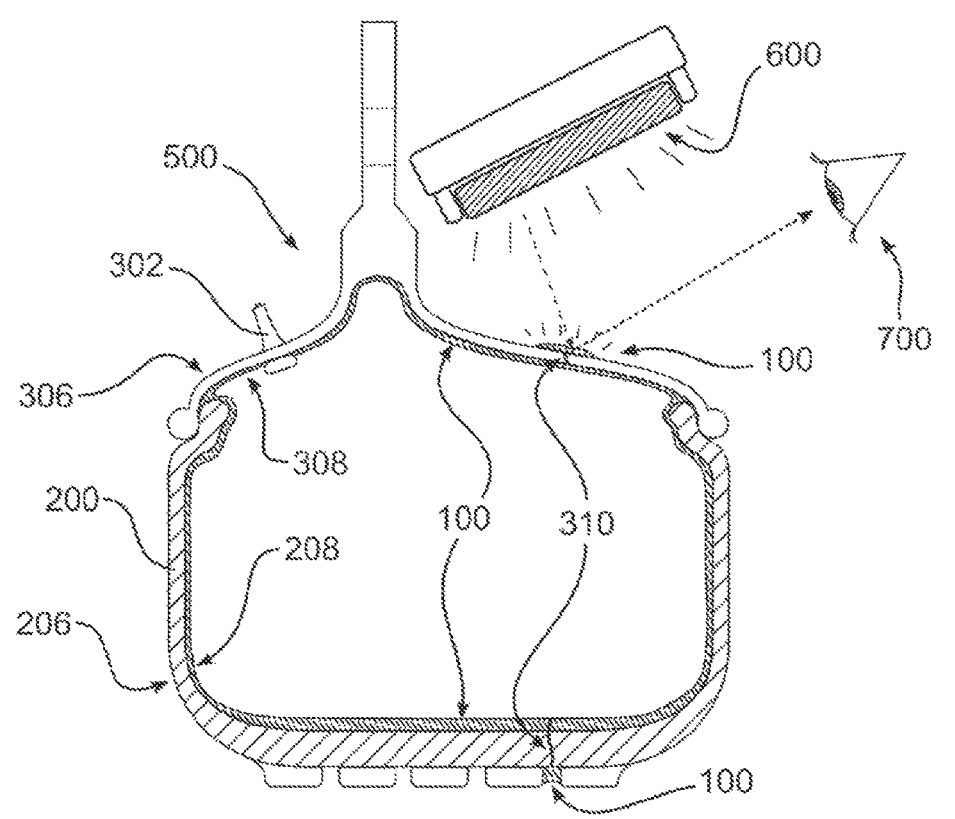
FIG. 5 depicts detecting seepage of the composition of the disclosure from cracks in the tire and rim using a light source.

With reference to FIG. 5, an inspection for one or more cracks or other openings 310 extending from an interior of a rim 306 or tire 206 (a pressurized side) therethrough to a side of a rim or tire at lower pressure, 308, 208, respectively, may be conducted immediately after a tire is pressurized, or at any point thereafter, including after pressure has been released from tire 200. The wheel 300 (rim and mounted tire) may remain mounted to the vehicle, or it may be removed. The tire and or rim may be cleaned, or not, although substantial amounts of debris could obscure seeped composition 100. However, if excess debris is thoroughly scrubbed away, it should be understood that some or all of seeped composition 100 may be removed, as well. The tire and or rim may be examined using any light source 600 which causes fluorescing of the dye included in composition 100. Light source 600 is admitted onto the surface or portion of surface to be inspected, and it is determined by observation with vision 700 if composition 100 has seeped through the tire or rim by observing light reflected in the color characteristic of the fluorescent dye when subjected to the particular light source used. It should be understood that such inspection can be accomplished using automation, including robotics, including using machine recognition of reflected visible light from the fluorescent dye.

The presence of the fluorescent dye on an exterior of the tire or rim is indicative of seepage through the tire or rim where it is known that no fluorescent dye was disposed about an exterior of the rim by any other means. Accordingly, if exposure to water or other cleansing activity sufficient to remove any inadvertently placed dye is not anticipated after adding composition 100 to a tire, it may be desired to clean the rim and tire exterior after filling, or to inspect the exterior of the rim and or tire, using suitable light, for the presence of fluorescent dye, prior to placing the tire or rim into service.

Seeping, in accordance with the disclosure, includes the gradual passage or oozing of a material from a contained side to an uncontained side through a small hole, crack, or opening in a containment vessel. Seepage can be undersirable, because it can result in a loss of pressure and therefore safety and stability of a rim or tire. Alternatively, seeping may be desirable where such seeping provides assurance that a tire or rim is a good candidate for disposal, refurbishment, or repair, and can be used to locate areas for refurbishment or repair, particularly where air loss or instability has been observed.

Once seepage has occurred, corrective measures may be taken to correct any defects, or to remove the rim and or tire from service. A reused tire or rim may be once again filled with composition 100, so that any future cracks, openings, holes or other sources of air loss may be detected in accordance with the disclosure.

In an alternative embodiment of the disclosure, a radiating substance 120 (not shown) other than a fluorescent dye is added to a conditioner, conditioner/sealant, conditioner/sealant/ballast, or conditioner/ballast of the disclosure, to form composition 100A (may be considered as illustrated where composition 100 is shown), wherein the radiating substance 120 is not visible to the human eye after seepage, but is detectable by electronic sensors useable by humans, or such sensors which form part of an automated seepage detection device. Such seepage detection device may be controlled by a computer, and may include robotic devices for cleaning and or manipulating the tire and or rim.

Examples of radiating substance 120 may include radioactive substances, or substances which emit non-visible light when subjected to energy, such as a different wavelength than a wavelength that is emitted.

Other methods of adding composition 100 of the disclosure are illustrated in FIGS. 6-8. More particularly, in FIG. 6, a manually operated pump 440 draws composition 100 from a reservoir 460, for example a 5 or 55 gallon pail or drum 450, through tube 448 filling a pump body 442 from the reservoir during a charging stroke, and ejecting composition 100 through dispensing port 444 under pressure in an pumping stroke. Composition may pass through a valve stem connector 406, secured to valve stem 302. In FIG. 7, a pump 440A includes a pneumatic pump motor 480, which can substitute for the manual pump body 442 of pump 440 of FIG. 6. Pneumatic pump motor 480 advantageously operates using compressed air, which is already readily available for filling tires. When filling a tire through valve stem 302 with more viscous forms of composition 100, the valve core can alternatively be removed from the valve stem first, to enable ready flow of composition 100 through the valve stem, and to facilitate cleaning.

The SIMONIZ GLADIATOR PUMP system, or a device with similar functionality, may be used, which may include a device such as that shown in FIG. 7, and which enables removing of a valve stem while maintaining pressure within the tire. The GLADIATOR system uses compressed air to prime and operate the pump, and to clear composition 100 from portions of associated hoses and the valve stem, after composition 100 has been added to an interior space between the tire and rim. A counter 454 can be used to count pump strokes, which can be converted to volume dispensed, or counter 454 can be configured to display volume dispensed directly. With reference to FIG. 8, an electric pump 470 can be used in place of pneumatic pump 448, instead of manual pump 440, or electric pump 440A. Gas sources other than air may be used, including inert gases, such as nitrogen.

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A method of detecting seepage from a wheel rim, comprising:
   placing a composition including propylene glycol and a fluorescent dye into an interior space formed between a tire and a rim; and
   waiting an interval, then inspecting an exterior surface of the wheel rim, using a light source which causes visible light to be emitted from the fluorescent dye, to detect the presence of dye which has seeped from the interior space through material of the rim to an exterior of the rim.

2. The method of claim 1, wherein the composition further includes triethanolamine.

3. The method of claim 1, wherein the composition further includes ceramic fibers.

4. The method of claim 1, wherein the composition further includes aluminosilicate fibers.

5. The method of claim 1, wherein the composition further includes cellulose.

6. The method of claim 1, wherein the composition is placed into the interior space when the tire has been partially assembled onto the rim.

7. The method of claim 1, wherein the composition is placed into the interior space when the tire is fully seated upon the rim.

8. The method of claim 7, wherein the composition is placed into the interior space when the tire is at least partially inflated.

9. The method of claim 1, wherein the dye is selected from DAYGLO A- and AX pigments, phthalocyanine, napthalocyanine, aluminum compound of aromatic amine, methane dye, azulene-squaric acid dye, UVITEX OB, TINOPAL SFp, TRY-33 (CAS#. 801-00023-5021-P), TRY-53, MT-6172-IB, WD-801, and fluorescein.

10. The method of claim 1, wherein the composition further includes a ballast material.

11. The method of claim 1, wherein the ballast material retards oxidation of metal of the rim in the presence of water.

12. The method of claim 1, wherein the rim is fabricated with at least one of aluminum, steel, brass, copper, iron, chrome, and magnesium alloy.

13. The method of claim 1, wherein inspecting is carried out using a sensor.

14. The method of claim 1, wherein the composition is added to the interior space using an air compressor and a pump, the pump operative to increase a gas pressure in the interior space while adding the composition.

15. A method of detecting cracks in wheel rim, comprising:
   placing a composition including propylene glycol, triethanolamine, and a fluorescent dye into an interior space formed between a tire and a rim; and
   waiting an interval, then inspecting an exterior surface of the wheel rim, using a UV light source which causes visible light to be emitted from the fluorescent dye, to detect the presence of dye which has seeped from the space through a crack in the material of the rim, to an exterior of the rim.

16. The method of claim 15, further including repairing the crack.

17. A system for detecting cracks in wheel rims, comprising:
   a composition including propylene glycol and a fluorescent dye; and
   a pumping system configured for adding the composition into an interior space formed between a tire and a rim under pressure.

18. The system of claim 17, further including an electronic detection system configured for detecting the presence of fluorescent dye which has seeped from the interior space through a crack in the material of the rim to an exterior of the rim.

19. A method of detecting seepage from a wheel rim, comprising:

placing a composition including a liquid carrier and a fluorescent dye into an interior space formed between a tire and a rim; and waiting an interval, then inspecting an exterior surface of the wheel rim, using a UV light source which causes visible light to be emitted from the fluorescent dye, to detect the presence of dye which has seeped from the interior space through material of the rim to an exterior of the rim.

20. The method of claim 19, wherein the liquid carrier includes at least one of water, ethylene glycol, and propylene glycol.

\* \* \* \* \*